(12) United States Patent
Kulakov

(10) Patent No.: US 9,021,396 B2
(45) Date of Patent: Apr. 28, 2015

(54) FLOWER LOOK INTERFACE

(75) Inventor: Petro Oleksiyovych Kulakov, Kharkiv (UA)

(73) Assignee: EchoStar Ukraine L.L.C., Kharkiv (UA)

( * ) Notice: Subject to any disclaimer, the term of this patent is extended or adjusted under 35 U.S.C. 154(b) by 24 days.

(21) Appl. No.: 13/394,310

(22) PCT Filed: Feb. 9, 2010

(86) PCT No.: PCT/UA2010/000002
§ 371 (c)(1),
(2), (4) Date: Mar. 5, 2012

(87) PCT Pub. No.: WO2011/099951
PCT Pub. Date: Aug. 18, 2011

(65) Prior Publication Data
US 2012/0179996 A1  Jul. 12, 2012

(51) Int. Cl.
*G06F 3/048* (2013.01)
*G06F 3/0482* (2013.01)

(52) U.S. Cl.
CPC .................... *G06F 3/0482* (2013.01)

(58) Field of Classification Search
None
See application file for complete search history.

(56) References Cited

U.S. PATENT DOCUMENTS

| | | | |
|---|---|---|---|
| 5,596,699 A | 1/1997 | Driskell | |
| 5,926,178 A * | 7/1999 | Kurtenbach | 715/834 |
| D444,794 S | 7/2001 | Nashida et al. | |
| D473,566 S | 4/2003 | Platz et al. | |
| D501,484 S | 2/2005 | Platz et al. | |
| 6,876,397 B2 * | 4/2005 | Funakoshi et al. | 348/569 |
| D552,120 S | 10/2007 | Arai | |
| D563,423 S | 3/2008 | Suzuki | |
| D586,355 S | 2/2009 | Mori et al. | |
| D603,415 S | 11/2009 | Lin et al. | |
| D603,416 S | 11/2009 | Poling et al. | |
| D603,417 S | 11/2009 | Osborne et al. | |

(Continued)

FOREIGN PATENT DOCUMENTS

WO    2011/099951 A1    8/2011

OTHER PUBLICATIONS

International Search Report and Written Opinion for PCT/UA2010/000002, dated Nov. 12, 2010, 9 pages.

(Continued)

*Primary Examiner* — William Bashore
*Assistant Examiner* — Rayeez Chowdhury
(74) *Attorney, Agent, or Firm* — Seed IP Law Group PLLC

(57) ABSTRACT

A user interface includes menu items arranged in a flower-like configuration. A number of menu items are peripherally arranged around a central item and mapped to selectable elements of an input device. Then, a display image including the menu is transmitted to a display. Subsequently, in response to a received selection, a corresponding action may be performed such as execution of a task, modification of the display image, and so on. In certain implementations, the menu items may be selected utilizing a cursor. The menu items may include a smaller portion located closer to the central item and a larger portion located further away. In still other implementations, the menu may also include a number of menu items that are not peripherally arranged around the central item. In response to a received selection, the menu items which are peripherally arranged around the central item may be altered.

19 Claims, 15 Drawing Sheets

(56) References Cited

U.S. PATENT DOCUMENTS

| | | |
|---|---|---|
| D607,001 S | 12/2009 | Ording |
| D607,468 S | 1/2010 | Ho |
| D640,266 S | 6/2011 | Furuya et al. |
| 2002/0060749 A1* | 5/2002 | Funakoshi et al. ............ 348/569 |
| 2004/0086840 A1* | 5/2004 | Redford et al. ........... 434/307 R |
| 2004/0098747 A1* | 5/2004 | Kay et al. ........................ 725/95 |
| 2004/0221243 A1 | 11/2004 | Twerdahl et al. |
| 2008/0059913 A1* | 3/2008 | Burtner et al. ................. 715/854 |
| 2008/0122796 A1* | 5/2008 | Jobs et al. ..................... 345/173 |
| 2008/0235627 A1* | 9/2008 | Torning et al. ................ 715/841 |
| 2009/0327963 A1* | 12/2009 | Mouilleseaux et al. ...... 715/834 |
| 2010/0306702 A1* | 12/2010 | Warner ......................... 715/811 |
| 2011/0029927 A1 | 2/2011 | Lietzke et al. |
| 2011/0055760 A1* | 3/2011 | Drayton et al. ............... 715/834 |

OTHER PUBLICATIONS

Restriction Requirement dated Sep. 2, 2011, for corresponding U.S. Appl. No. 29/355,592, 6 Pages.

* cited by examiner

FLOWER LOOK INTERFACE

FIELD OF THE INVENTION

This disclosure relates generally to user interfaces, and more specifically to user interfaces with menu items arranged in a flower-like configuration.

SUMMARY

The present disclosure discusses systems and methods for providing user interfaces with menu items arranged in a flower-like configuration. Such user interfaces may be provided by generating a menu that includes a number of menu items peripherally arranged around a central menu item, mapping menu items to selectable elements of an input device, and transmitting a display image that includes the menu to a display device. A selection of the selectable elements may then be received. In response to the selection, an action may be performed that is associated with the menu item corresponding to the selection. Such actions may include performing a task, altering the menu, generating a new menu, returning to a previous menu, exiting the menu, and so on. In this way, a user may be able to understand and utilize the user interface much faster than a user interface including hierarchical lists of menus.

In certain implementations, the selectable elements may include keys of a device such as a keyboard, virtual keyboard, remote control, numeric keypad, and so on. In other implementations, the menu items may include a selectable area that may be selected utilizing a cursor mapped to elements of a track pad, mouse, touch screen, and so on. In such implementations, the selectable area of the menu items may include a smaller portion located closer to the central menu item and a larger portion located further away from the central menu item. In this way, the cursor may be rotated a minimum of distance around the central menu item in order to select any of the menu items.

In still other implementations, in addition to including the number of menu items peripherally arranged around the central menu item, the menu may also include a number of menu items that are not peripherally arranged around the central menu item. In such implementations, one or more of the menu items may be associated with an action that alters which of the menu items are peripherally arranged around the central menu item. If a selection associated with such menu items is received, the menu items peripherally arranged around the central menu item may be altered, providing additional menu flexibility.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems and methods that embody various elements of the present disclosure. However, it should be understood that the described disclosure may be practiced in a variety of forms in addition to those described herein.

Computing devices are devices that manipulate data by executing instructions stored in a machine-readable media utilizing one or more processing units. Examples of such devices include desktop computers, television receivers, personal digital assistants, content streaming devices in satellite transmission systems, and so on. Computing devices typically interact with users through interfaces such as menus. Standard menus may be implemented as a hierarchical list of menus. Users may be familiar with navigating hierarchical lists, but such menus may not be the fastest configuration.

The present disclosure involves systems and methods that provide user interfaces arranged with menu items arranged in a flower-like a configuration. A computing device may generate a menu that includes multiple menu items peripherally arranged around a central menu item. The menu items may be circularly arranged around the central menu item, triangularly arranged around the central menu item, and so on. The computing device may map the menu items to selectable elements of an input device. Finally, the computing device transmits a display image that includes the menu to a display device. If a selection of one or more selectable elements is received, the computing device may perform an associated action, such as executing a task, generating a display image that includes an altered menu, generating a display image that includes a new or previous menu, generating a display image that does not include a menu, and so on.

Figure 1:
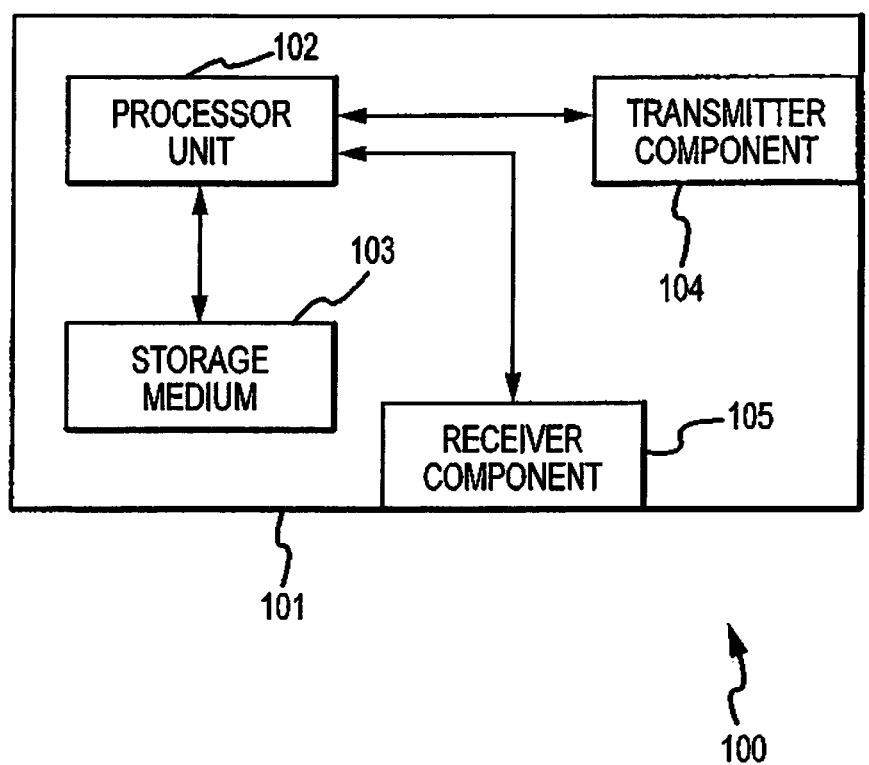
FIG. 1 is a block diagram illustrating a system for providing a user interface.

FIG. 1 is a block diagram illustrating a system 100 for providing a user interface, in accordance with an embodiment of the present disclosure. The system 100 includes a computing device 101. The computing device 101 may be any kind of computing device such as a television receiver, a set-top box, and so on. The computing device 101 includes at least one or more processing units 102, a storage medium 103 (which may be any machine-readable storage medium), a transmitter component 104, and a receiver component 105. The transmitter component 104 may be wired and/or wirelessly coupled to an output device which may be a display device such as a liquid crystal display, a cathode ray tube display, and so on. The transmitter component 104 may be a port with a hardwired connection to the output device. The receiver component 105 may be wired and/or wirelessly coupled to an input device (not shown) such as a keyboard, a keypad, a virtual keyboard, a virtual keypad, a touch screen, a remote control, a mouse, a trackball, a track pad, and so on. The one or more processing units 104 may execute software instructions stored in the storage medium 103 to generate and provide user interfaces.

The processing unit 102 may generate a display image that includes a menu, the menu including multiple menu items peripherally arranged around a central menu item. The processing unit 102 may also map the menu items to selectable elements of an input device. Then, the processing unit 102 may transmit the display image to an output device via the transmitter component 104. Subsequently, the processing unit 102 may receive a selection of one or more selectable elements of the input device via the receiver component 105. The processing unit 102 may perform one or more actions based on the received selection. One such action may include executing a task corresponding to the selection, such as playing a movie file. Other such actions may include modifying the menu, generating a new menu, returning to a previous menu, exiting the menu, and so on. In this case the processing unit 102 may generate a new display image based on the received selection and transmit it to the display device via the transmitter component 104.

Figure 2A:
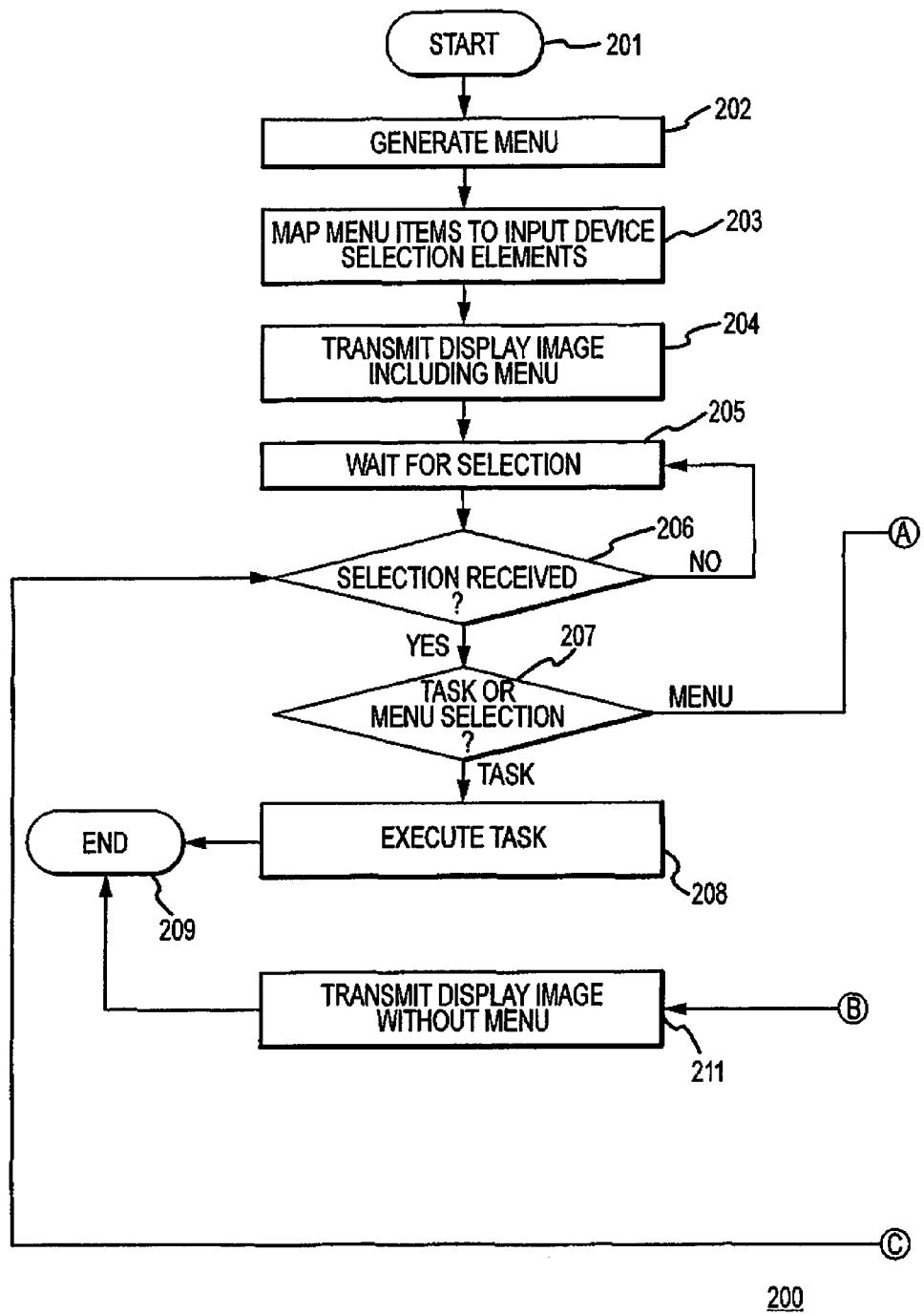
FIGS. 2A and 2B are flowcharts illustrating a first method of providing a user interface which may be performed by the system of FIG. 1.
Figure 2B:
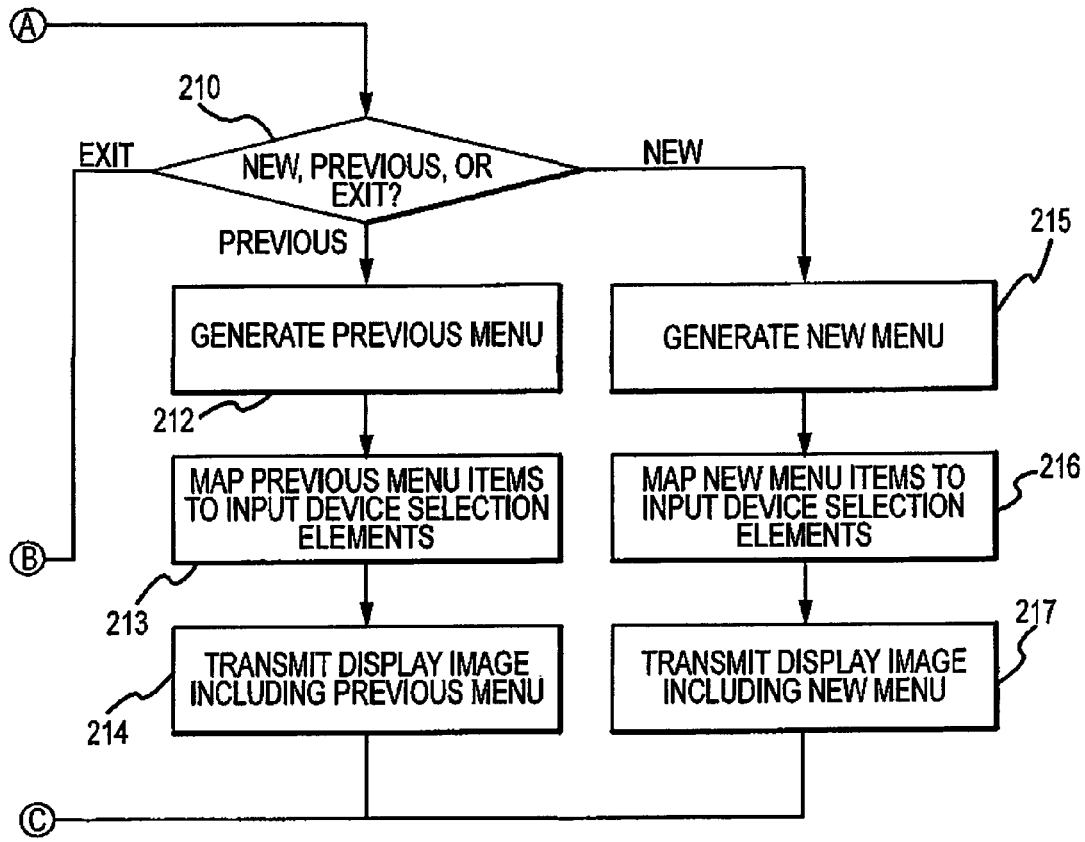

FIGS. 2A and 2B illustrate a first method 200 of providing a user interface which may be performed by the processing unit 102 of the computing device 101 loading and executing one or more instructions embodied in a computer-readable and/or machine-readable medium, such as the storage media 103 and/or another storage medium.

The flow begins at block 201 and proceeds to block 202. At block 202, the processing unit 102 generates menu including multiple menu items peripherally arranged around a central menu item and the flow proceeds to block 203. The menu items may be circularly arranged around the central menu item, triangularly arranged around the central menu item, and so on. At block 203, the processing unit 102 maps menu items to selectable elements of the input device and the flow proceeds to block 204. At block 204, the processing unit 102 transmits a display image that includes the menu to a display device via the transmitter component 104 and the flow proceeds to block 205. At block 205, the processing unit 102 waits for a selection of one or more selectable elements of the input device to be received. The flow then proceeds to block 206. At block 206, the processing unit 102 determines whether a selection has been received via receiver component 105. If a selection has been received, the flow proceeds to block 207. If a selection has not been received, the flow proceeds to block 205.

At block 207, the processing unit 102 determines whether the selection specifies to execute a task or alter the menu. If the selection specifies to execute a task, the flow proceeds to block 208. If the selection specifies to alter the menu, the flow proceeds to block 210. At block 208, the processing unit 102 executes the specified task and the flow proceeds to block 209 and ends.

At block 210, the processing unit 102 determines whether the selection specifies to exit the menu, return to a previous menu, or generate a new menu (such as a submenu for a selected menu item). If the selection specifies to exit the menu, the flow proceeds to block 211. If the selection specifies to return to a previous menu, the flow proceeds to block 212. If the selection specifies to generate a new menu, the flow proceeds to block 215. At block 211, the processing unit 102 transmits an updated display image that does not include the menu to the display device via the transmitter component 104. The flow then proceeds to block 209.

At block 212, the processing unit 102 generates the previous menu including previous multiple menu items and the flow proceeds to block 213. At block 213, the processing unit 102 maps the previous menu items to selectable elements of the input device and the flow, proceeds to block 214. At. block 214, the processing unit 102 transmits an updated display image that includes the previous menu to the display device via the transmitter component 104. The flow then proceeds to block 206.

At block 215, the processing unit 102 generates the new menu including new multiple menu items and the flow proceeds to block 216. At block 216, the processing unit 102 maps the new menu items to selectable elements of the input device and the flow proceeds to block 217. At block 217, the processing unit 102 transmits an updated display image that includes the new menu to the display device via the transmitter component 104. The flow then proceeds to block 206.

Figure 3A:
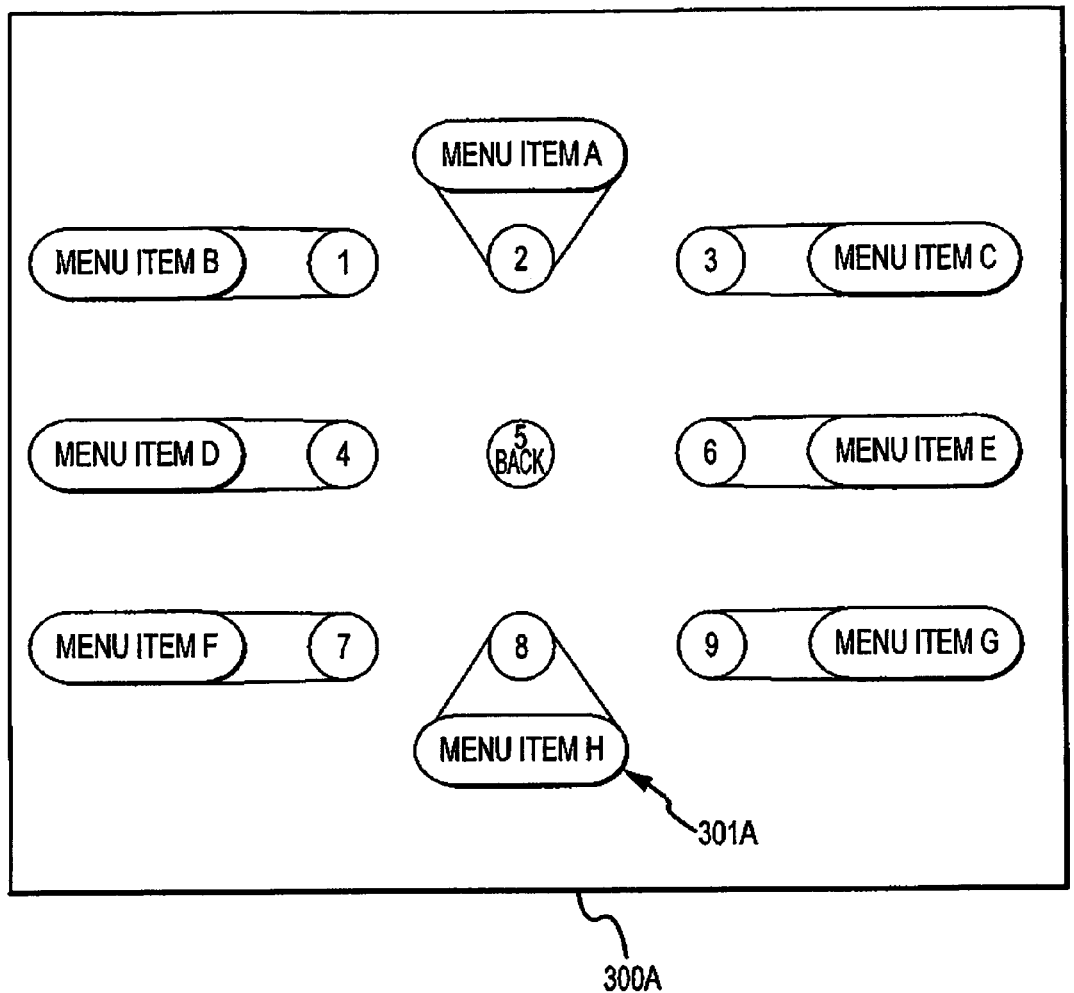
FIG. 3A is a diagram illustrating a first sample user interface which may be provided by the method of FIGS. 2A and 2B.

FIG. 3A illustrates a first sample user interface 300A, including a menu 301A, which may be provided by the method 200. As illustrated, the menu 301A includes a number of menu items peripherally arranged around a central menu item. In this example, the menu items are circularly arranged around the central menu item. Each menu item includes a menu item action indicator (Menu Item A through Menu Item H and Back) and an associated selectable element indicator (1 through 9). Each selectable element indicator is mapped to selection elements of an input device, which in this example may be numeric keys 1 through 9 of an input device that includes numeric keys such as a keyboard, virtual keyboard, remote, numeric keypad, and so on. As the menu items are peripherally arranged around the central menu item to imitate the arrangement of the selectable elements of the input device, the menu items essentially describe portions of the input device. This enables a user to navigate the menu 301A quickly, as the information aids the user in associating menu elements with the appropriate selectable elements.

In response to a user selection of one or more of the numeric keys 1 through 9, the action indicated by the menu item action indicator associated with the corresponding selectable element indicator may be performed. For example, menu item action indicator "Menu Item A" may indicate the action of playing a tutorial video. If a user selects the numeric key 2, the tutorial video may be played.

Figure 3B:
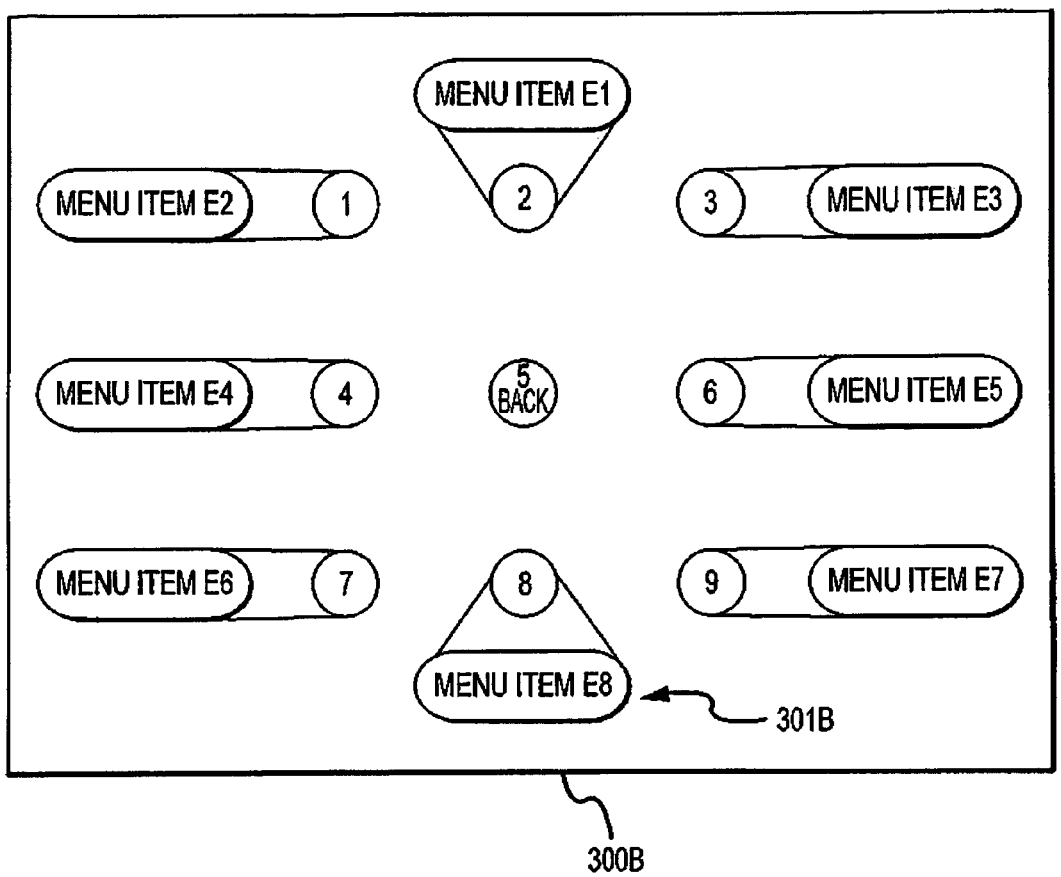
FIG. 3B is a diagram illustrating a modification of the first sample user interface of FIG. 3A.

By way of another example, menu item action indicator "Menu Item E" may indicate the action of generating an submenu. If a user selects the numeric key 6, the sample user interface 300B that includes the submenu 301B may be generated, as illustrated in FIG. 3B. As illustrated, the submenu 301B includes a number of submenu items peripherally arranged around a central submenu item. Each submenu item includes a submenu item action indicator (Menu Item E1 through Menu Item E8 and Back) and an associated selectable element indicator (1 through 9). The selection elements of the input device may be remapped to the selectable element indicators. In response to a user selection of one or more of the numeric keys 1 through 9, the action indicated by the submenu item action indicator associated with the corresponding selectable element indicator may be performed. For example, submenu item action indicator "Back" may indicate the action of returning to the previous menu 301A. If a user selects the numeric key 5, the previous menu 301A may be generated and the selection elements of the input device may be remapped again to the selectable element indicators, as illustrated in FIG. 3A.

Figure 3C:
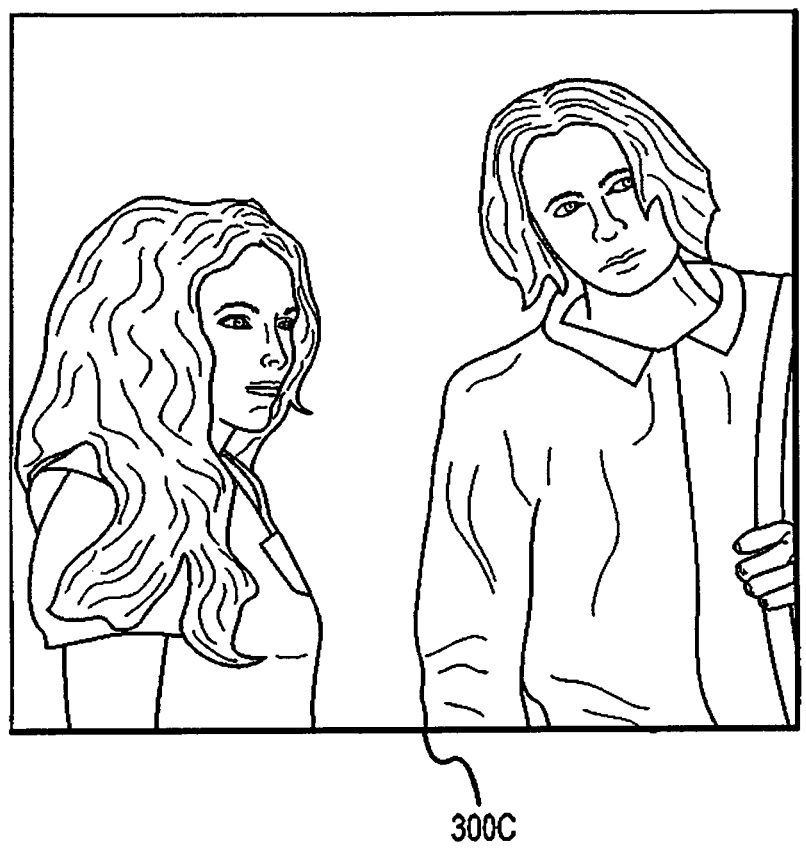
FIG. 3C is a diagram illustrating a modification of the first sample user interface of FIG. 3A.

Referring again to FIG. 3A, menu item action indicator "Back" may indicate the action of exiting the menu 301A. If a user selects the numeric key 5, the sample user interface 300C that does not include the menu 301A may be generated, as illustrated in FIG. 3C. In this example the sample user interface 300C is a display screen for video programming content and therefore the sample user interface 300C that does not include the menu 301A displays the video programming content.

Although the present example illustrates the menu 301A-301B as occupying the majority or entirety of the sample user interface 300A-300C, it is understood that other implementations may involve overlaying menus over other content, such as video programming content, without departing from the scope of the present disclosure. Additionally, the menu may occupy a portion of a display, such as a corner of the display. Moreover, although the present example illustrated the menu action item indicators and associated selectable element indicators as text, in some implementations action item indicators and/or associated selectable element indicators may be presented as icons, images, and so on.

Figure 4A:
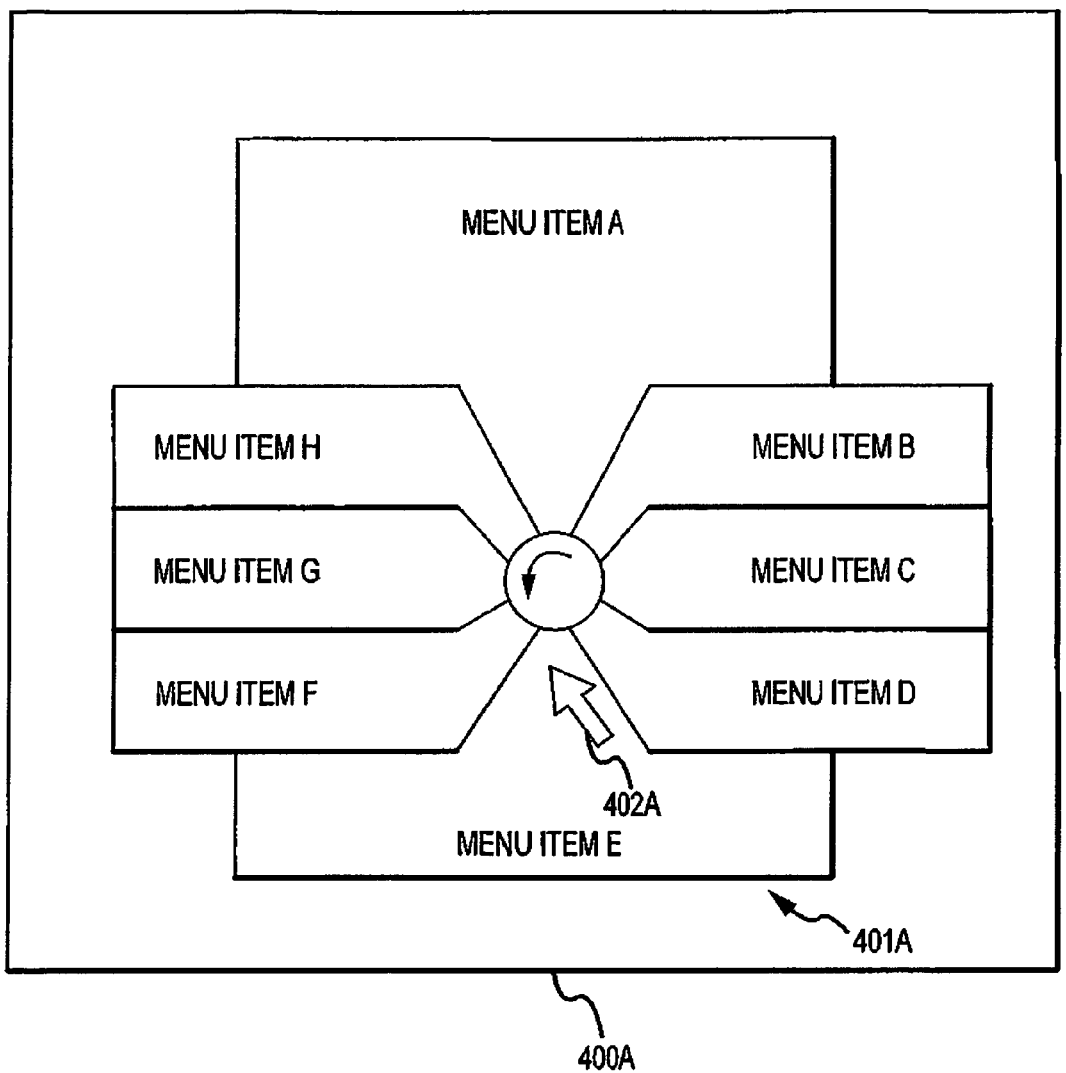
FIG. 4A is a diagram illustrating a second sample user interface which may be provided by the method of FIGS. 2A and 2B.

FIG. 4A illustrates a second sample user interface 400A, including a menu 401A, which may be provided by the method 200. As illustrated, the menu 401 A includes a cursor 402A and a number of menu items peripherally arranged around a central menu item. In this example, the menu items are circularly arranged around the central menu item. Each menu item includes a menu item action indicator (Menu Item A through Menu Item H and a back arrow) and an associated selectable area. The selectable area of the menu items is selectable utilizing the cursor 402A by moving the cursor 402A over the respective selectable area and selecting, and is thus mapped to selection elements of an input device that are mapped to the cursor 402A, such as the selection and cursor movement elements of a track pad, mouse, touch screen, and so on.

As illustrated, the selectable area of the menu items, other than the central menu item, each have a smaller portion located closer to the central menu item and a larger portion located further from the central menu item. As the portion of each selectable area close to the central menu item is smaller, a minimum amount of movement of the cursor 402A is needed to move the cursor 402A closely around the central menu item in order to select among the different menu items. However, because the portion of each selectable area further from the central menu item is larger, more space is available for displaying the respective menu item action indicators. Thus, more space is available to display the respective menu item action indicators while minimal movement of the cursor 402A is needed to select among the different menu items.

In response to a user selection of a selectable area associated with one of more of the menu items, the action indicated by the menu item action indicator associated with the corresponding selectable area may be performed. For example, menu item action indicator "Menu Item H" may indicate the action of playing an on-demand movie. If a user selects the selectable area associated with "Menu Item H", the on-demand movie may be played.

Figure 4B:
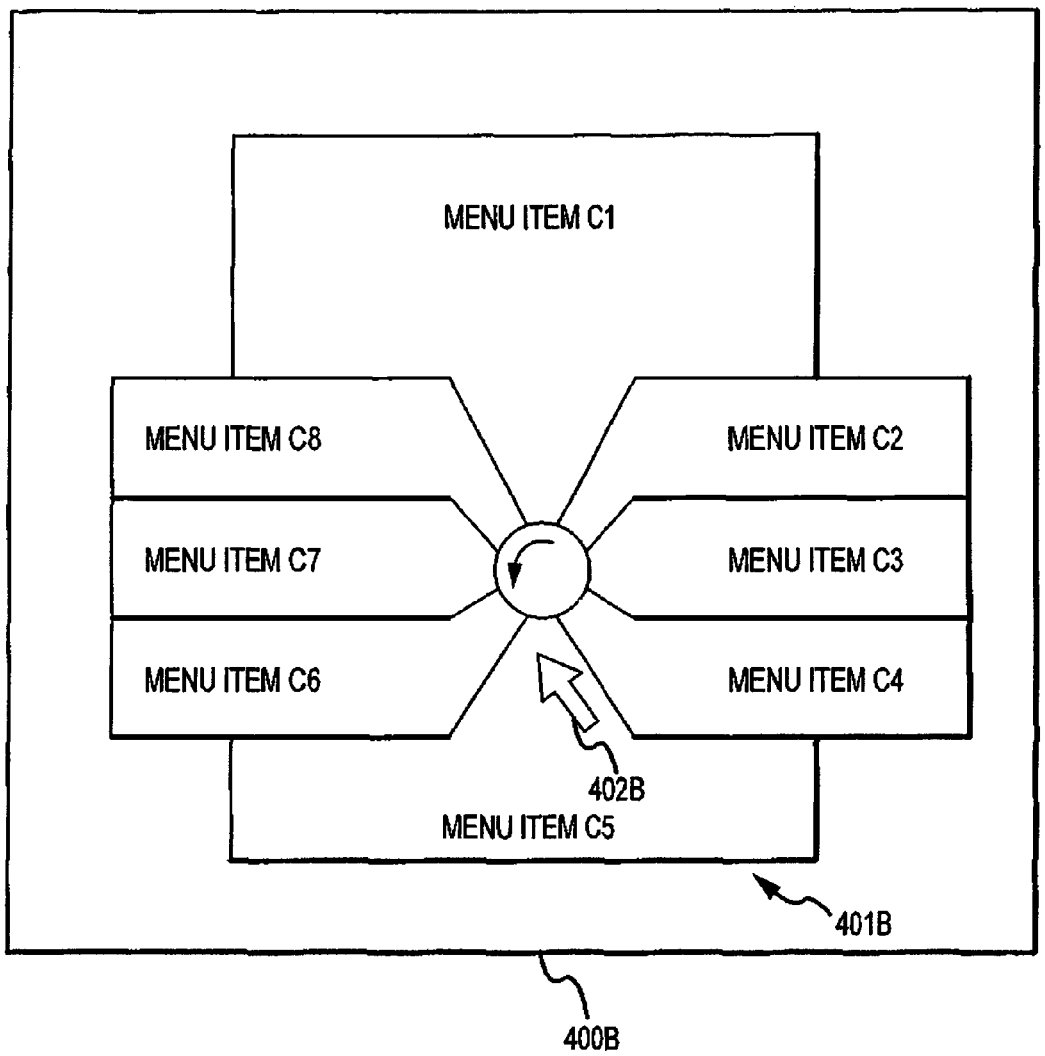
FIG. 4B is a diagram illustrating a modification of the second sample user interface of FIG. 4A.

By way of another example, menu item action indicator "Menu Item C" may indicate the action of generating an submenu. If a user selects the selectable area associated with "Menu Item C", the sample user interface 400B that includes the submenu 401B may be generated, as illustrated in FIG. 4B. As illustrated, the submenu 401B includes the cursor 402B and a number of submenu items peripherally arranged around a central submenu item. Each submenu item includes a submenu item action indicator (Menu Item C1 through Menu Item C8 and a back arrow) and an associated selectable area. The cursor 402B is remapped to the selection elements of the input device such that the cursor 402B may be utilize the select the selectable area of one or more of the submenu items. The selectable area of the submenu items, other than the central submenu item, each have a smaller portion located closer to the central submenu item and a larger portion located further from the central menu item.

In response to a user selection of one or more of the selectable areas, the action indicated by the submenu item action indicator associated with the corresponding associated selectable element indicator may be performed. For example, submenu item action indicator "back arrow" may indicate the action of returning to the previous menu 401 A. If a user selects e selectable area associated with "back arrow", the previous menu 401A may be generated and the cursor 402A is remapped again to the selection elements of the input device such that the cursor 402A may be utilize the select the selectable area of one or more of the menu items, as illustrated in FIG. 4A.

Figure 4C:
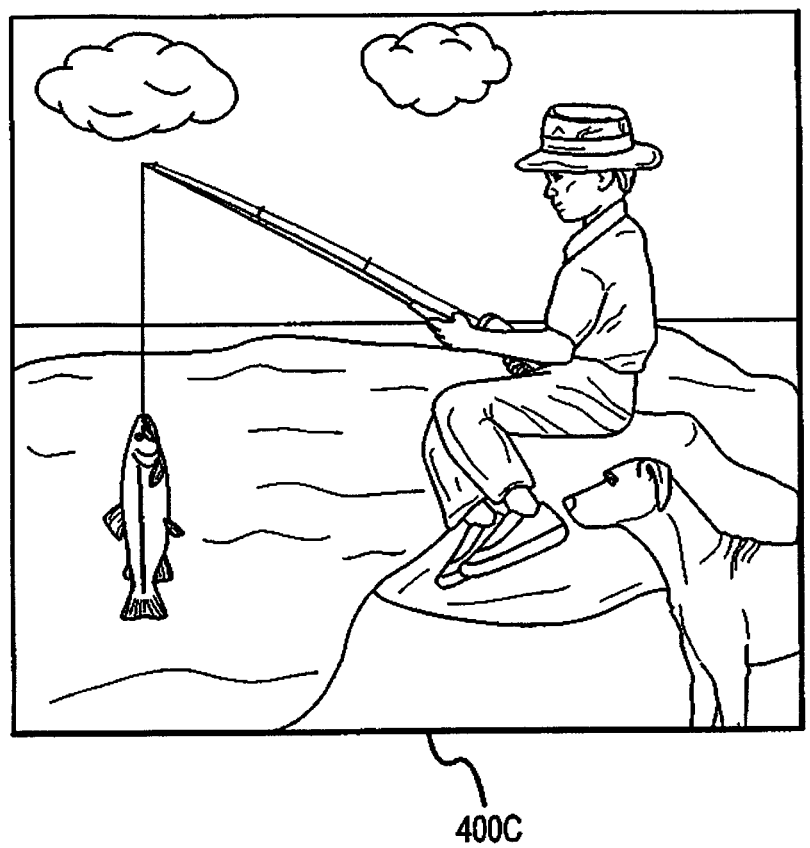
FIG. 4C is a diagram illustrating a modification of the second sample user interface of FIG. 4A.

Referring again to FIG. 4A, menu item action indicator "back arrow" may indicate the action of exiting the menu 401A. If a user selects the selectable area associated with "back arrow", the sample user interface 400C that does not include the menu 401A may be generated, as illustrated in FIG. 4C. In this example the sample user interface 400C is a display screen for video programming content and therefore the sample user interface 400C that does not include the menu 401A displays the video programming content.

Figure 5A:
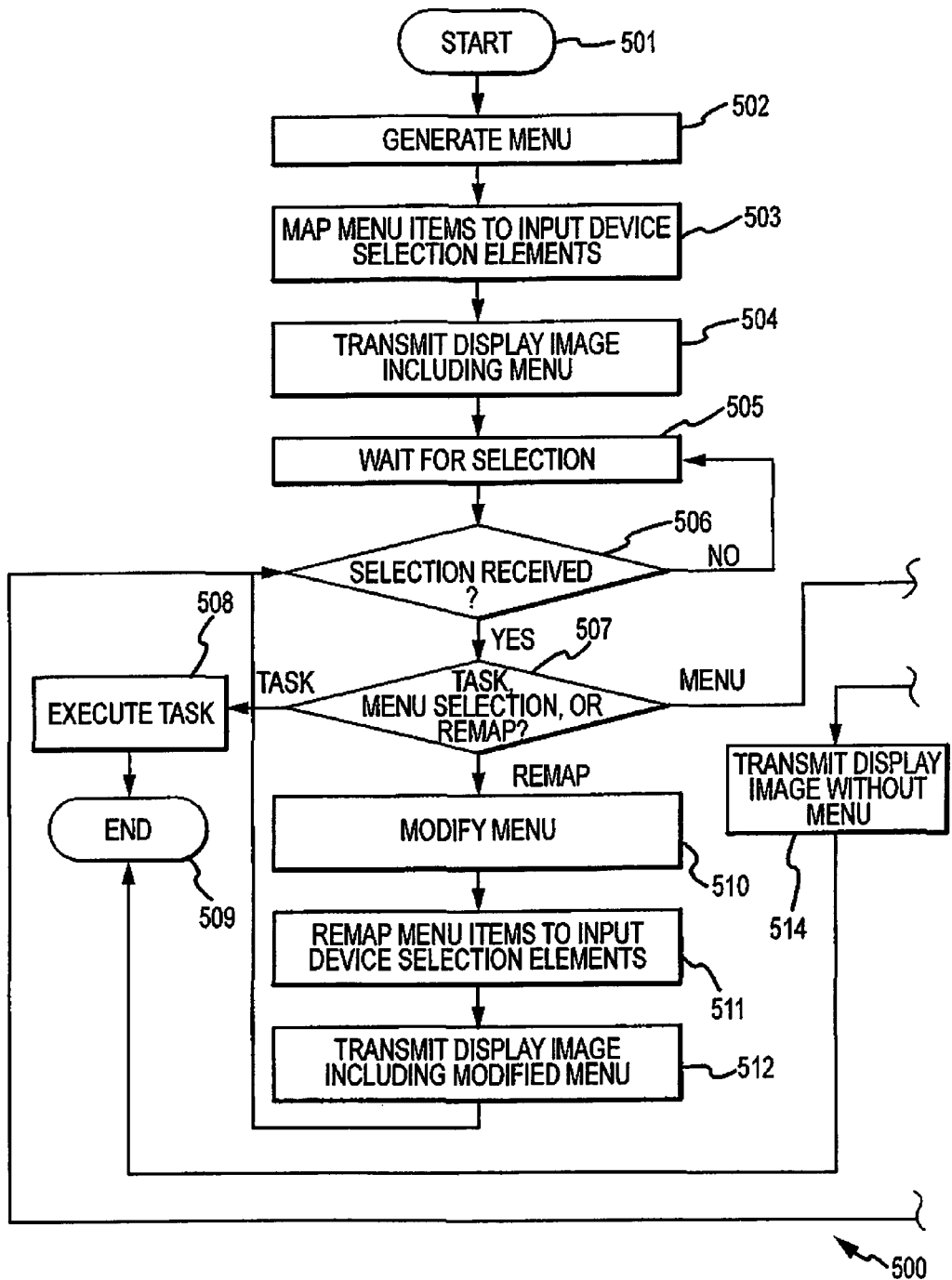
FIGS. 5A and 5B are flowcharts illustrating a second method of providing a user interface which may be performed by the system of FIG. 1.
Figure 5B:
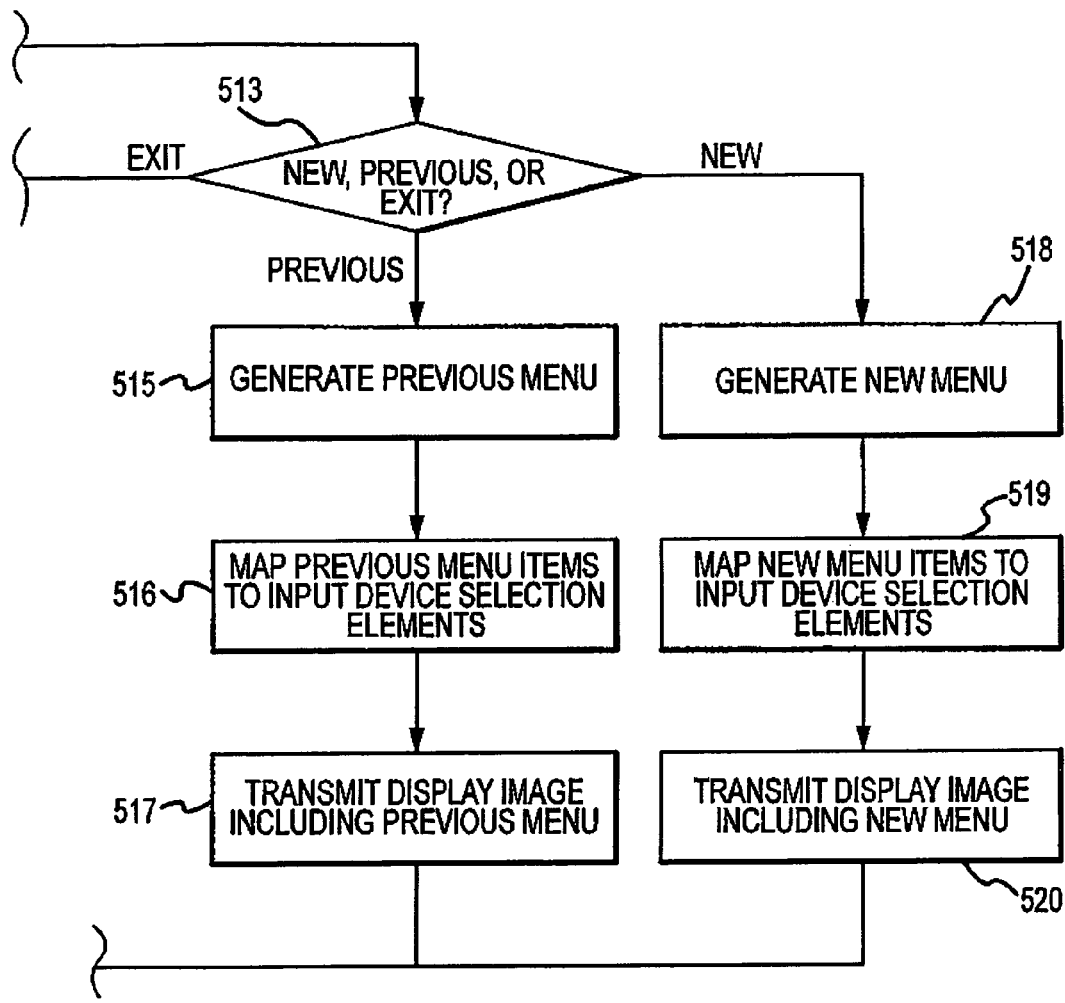

FIGS. 5A and 5B illustrate a second method 500 of providing a user interface which may be performed by the processing unit 102 of the computing device 101 loading and executing one or more instructions embodied in a computer-readable and/or machine-readable medium, such as the storage media 103 and/or another storage medium.

The flow begins at block 501 and proceeds to block 502. At block 502, the processing unit 102 generates menu including multiple menu items peripherally arranged around a central menu item and the flow proceeds to block 503. In this example, the menu items are circularly arranged around the central menu item. At block 503, the processing unit 102 maps menu items to selectable elements of the input device and the flow proceeds to block 504. At block 504, the processing unit 102 transmits a display image that includes the menu to a display device via the transmitter component 104 and the flow proceeds to block 505. At block 505, the processing unit 102 waits for a selection of one or more selectable elements of the input device to be received. The flow then proceeds to block 506. At block 506, the processing unit 102 determines whether a selection has been received via receiver component 105. If a selection has been received, the flow proceeds to block 507. If a selection has not been received, the flow proceeds to block 505.

At block 507, the processing unit 102 determines whether the selection specifies to execute a task, alter the menu, or modify the menu. If the selection specifies to execute a task, the flow proceeds to block 508. If the selection specifies to modify the menu, the flow proceeds to block 510. If the selection specifies to alter the menu, the flow proceeds to block 513. At block 508, the processing unit 102 executes the specified task and the flow proceeds to block 509 and ends.

At block 510, the processing unit 102 modifies the previous menu as specified and the flow proceeds to block 511. At block 511, the processing unit 102 remaps the modified menu items to selectable elements of the input device and the flow proceeds to block 512. At block 512, the processing unit 102 transmits an updated display image that includes the modified menu to the display device via the transmitter component 104. The flow then proceeds to block 506.

At block 513, the processing unit 102 determines whether the selection specifies to exit the menu, return to a previous menu, or generate a new menu (such as a submenu for a selected menu item). If the selection specifies to exit the menu, the flow proceeds to block 514. If the selection specifies to return to a previous menu, the flow proceeds to block 515. If the selection specifies to generate a new menu, the flow proceeds to block 518. At block 514, the processing unit 102 transmits an updated display image that does not include the menu to the display device via the transmitter component 104. The flow then proceeds to block 509.

At block 515, the processing unit 102 generates the previous menu including previous multiple menu items and the flow proceeds to block 516. At block 516, the processing unit 102 maps the previous menu items to selectable elements of the input device and the flow proceeds to block 517. At block 517, the processing unit 102 transmits an updated display image that includes the previous menu to the display device via the transmitter component 104. The flow then proceeds to block 506.

At block 518, the processing unit 102 generates the new menu including new multiple menu items and the flow proceeds to block 519. At block 519, the processing unit 102 maps the new menu items to selectable elements of the input device and the flow proceeds to block 520. At block 520, the processing unit 102 transmits an updated display image that includes the new menu to the display device via the transmitter component 104. The flow then proceeds to block 506.

Figure 6A:
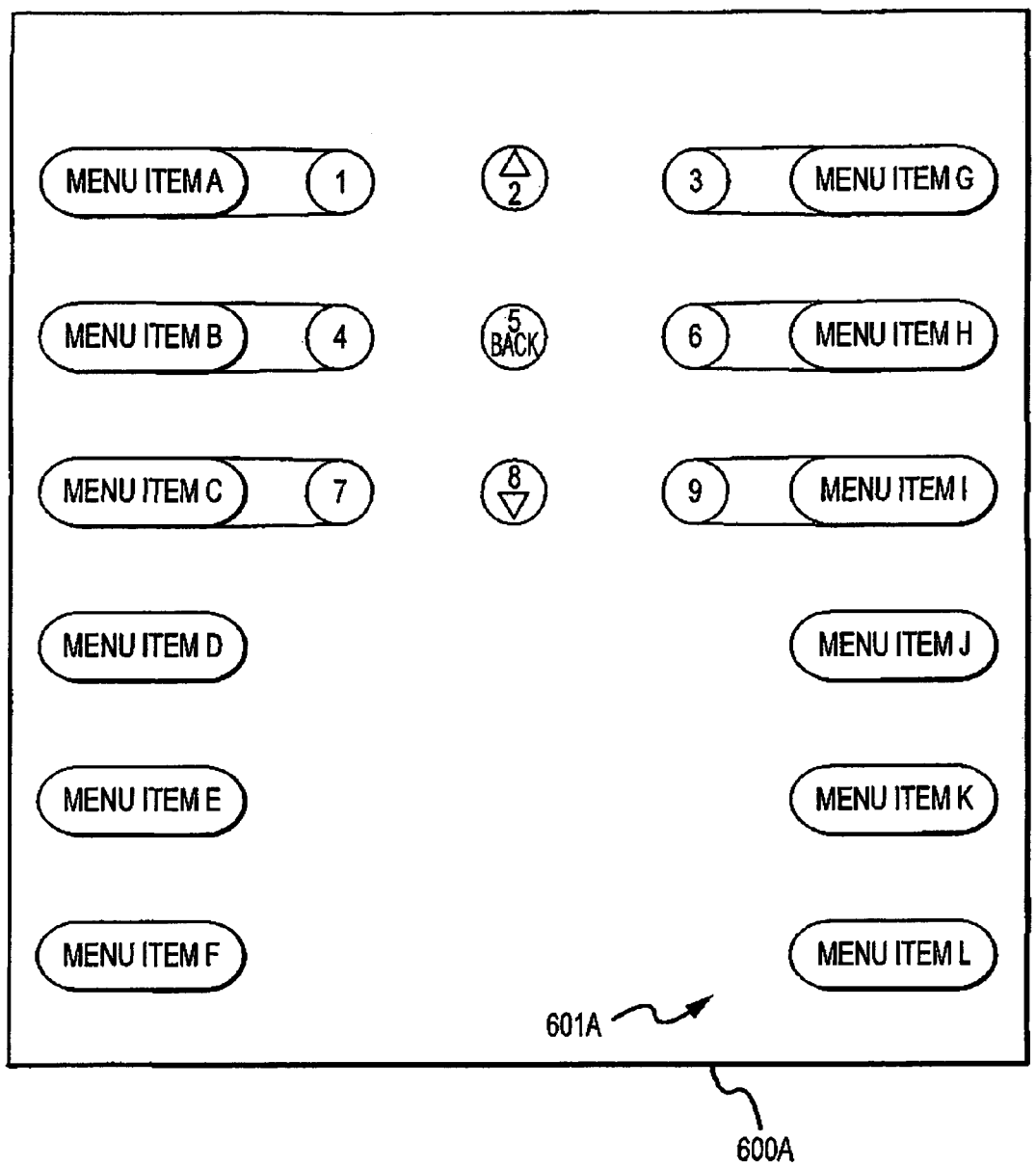
FIG. 6A is a diagram illustrating a third sample user interface which may be provided by the method of FIGS. 5A and 5B.

FIG. 6A illustrates a third sample user interface 600A, including a menu 601A, which may be provided by the method 500. As illustrated, the menu 601A includes a number of menu items peripherally arranged around a central menu item and a number of menu items that are not peripherally arranged around the central menu item. Each menu item includes a menu item action indicator (Menu Item A through Menu Item L, Back, up, and down). The menu items that are peripherally arranged around the central menu item (the menu items that respectively include the menu item action indicators Menu Item A through Menu Item C and Menu Item G through Menu Item I) and the central menu item also include an associated selectable element indicator (1 through 9). Each selectable element indicator is mapped to selection elements of an input device, which in this example may be numeric keys 1 through 9 of an input device that includes numeric keys such as a keyboard, virtual keyboard, remote, numeric keypad, and so on. In response to a user selection of one or more of the numeric keys 1 through 9, the action indicated by the menu item action indicator associated with the corresponding selectable element indicator may be performed. For example, menu item action indicator "Menu Item I" may indicate the action of playing a tutorial video. If a user selects the numeric key 2, the tutorial video may be played.

Figure 6B:
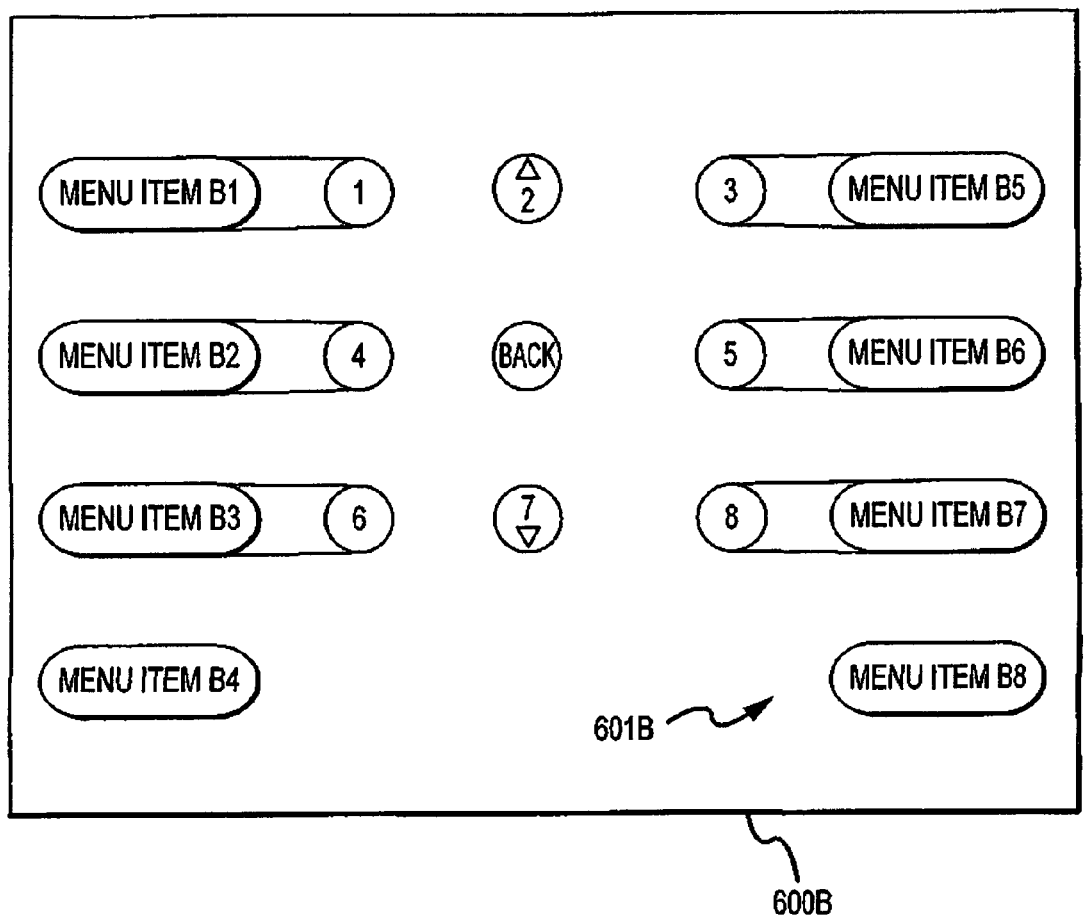
FIG. 6B is a diagram illustrating a modification of the third sample user interface of FIG. 6A.

By way of another example, menu item action indicator "Menu Item B" may indicate the action of generating an submenu. If a user selects the numeric key 4, the sample user interface 600B that includes the submenu 601B may be generated, as illustrated in FIG. 6B. As illustrated, the submenu 601B includes a number of submenu items peripherally arranged around a central submenu item and a number of submenu items that are not peripherally arranged around the central submenu item. Each submenu item includes a submenu item action indicator (Menu Item B1 through Menu Item B8, Back, up, and down). The submenu items that are peripherally arranged around the central submenu item (the submenu items that respectively include the submenu item action indicators Menu Item B1 through Menu Item B3 and Menu Item B5 through Menu Item B7) and the central submenu item also include an associated selectable element indicator (1 through 9). The selection elements of the input device may be remapped to the selectable element indicators of the central submenu item and the submenu items that are peripherally arranged around the central submenu item. In response to a user selection of one or more of the numeric keys 1 through 9, the action indicated by the submenu item action indicator associated with the corresponding selectable element indicator may be performed. For example, submenu item action indicator "Back" may indicate the action of returning to the previous menu 601A. If a user selects the numeric key 5, the previous menu 601A may be generated and the selection elements of the input device may be remapped again to the selectable element indicators the central menu item and the menu items that are peripherally arranged around the central menu item, as illustrated in FIG. 6A.

Figure 6C:
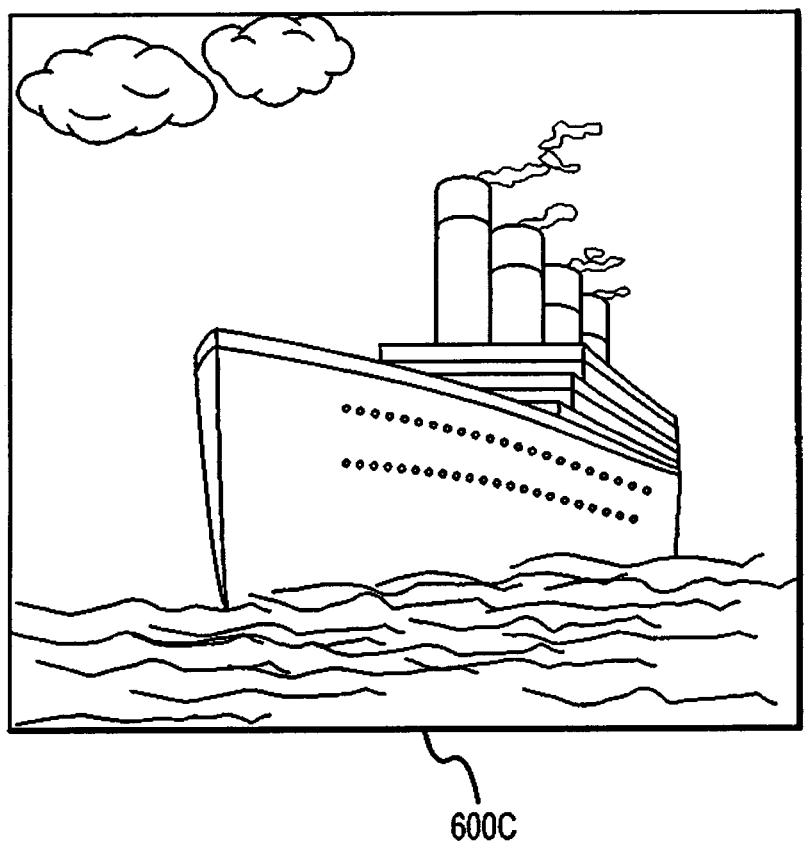
FIG. 6C is a diagram illustrating a modification of the third sample user interface of FIG. 6A.

Referring again to FIG. 6A, menu item action indicator "Back" may indicate the action of exiting the menu 601A. If a user selects the numeric key 5, the sample user interface 600C that does not include the menu 601A may be generated, as illustrated in FIG. 6C. In this example the sample user interface 600C is a display screen for video programming content and therefore the sample user interface 600C that does not include the menu 601A displays the video programming content.

Figure 6D:
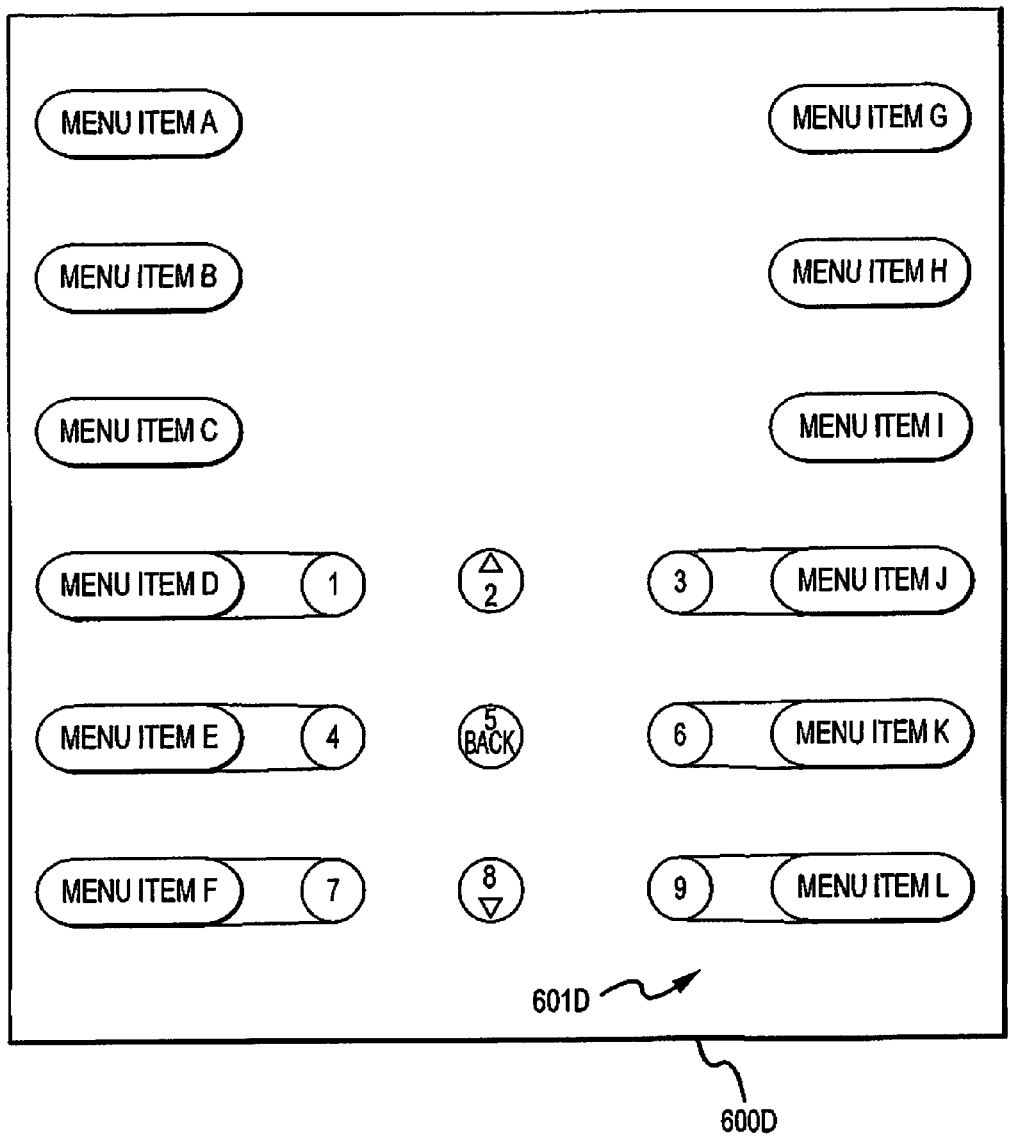
FIG. 6D is a diagram illustrating a modification of the third sample user interface of FIG. 6A.

Referring again to FIG. 6A, menu item action indicator "down" may indicate the action of altering which of the menu items are peripherally arranged around the central menu item. If a user selects the numeric key 8, the sample user interface 600D may be generated, as illustrated in FIG. 6D. Thus, the menu items are altered to be peripherally arranged around the central menu item as illustrated in FIG. 6D. As illustrated, the menu items that respectively include the menu item action indicators Menu Item D through Menu Item F and Menu Item J through Menu Item L are peripherally arranged around the central menu item rather than the menu items that respectively include the menu item action indicators Menu Item A through Menu Item C and Menu Item G through Menu Item I. Also as illustrated, the menu items that respectively include the menu item action indicators Menu Item D through Menu Item F and Menu Item J through Menu Item L now include an associated selectable element indicator (1, 4, 7, 3, 6, and 9) whereas the menu items that respectively include the menu item action indicators Menu Item A through Menu Item C and Menu Item G through Menu Item I now do not include associated selectable element indicators.

With respect to the sample user interface 600D, menu item action indicator "up" may indicate the action of altering which of the menu items are peripherally arranged around the central menu item. If a user selects the numeric key 8, the sample user interface 600A may be generated, as illustrated in FIG. 6A. Thus, the menu items are altered to be peripherally arranged around the central menu item again as illustrated in FIG. 6A.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may take the form of, but is not limited to, a: magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for providing a user interface, comprising:
   generating a menu, utilizing at least one processing unit, the menu including a plurality of menu items peripherally arranged around a central menu item;
   mapping the plurality of menu items to a plurality of selectable numbers on at least one remote input device, wherein
      at least one of the plurality of menu items is mapped to a respective selectable number on the at least one remote input device,
      at least one of the plurality of menu items includes a menu item action indicator and an associated number, the number identifying the selectable number on the at least one remote input device mapped to the respective menu item of the plurality of menu items,
      the menu item action indicator identifying an action associated with the respective menu item of the plurality of menu items,
      at least a portion of the peripheral arrangement of the plurality of menu items correspond to the visual layout of the selectable numbers on the at least one remote input device,
      at least one of the selectable numbers on the at least one remote input device is used to alter the central menu item around which the peripherally arranged menu items are arranged and to alter the mapping of the at least one of the plurality of menu items to a respective selectable number on the at least one remote input device, and
      at least one of the selectable numbers on the at least one remote input device is used to perform an action; and
   transmitting a display image that includes the menu to at least one display device.

2. The method of claim 1, further comprising:
   receiving a selection of one of the plurality of selectable numbers from the at least one remote input device, the received selection indicating the respective menu item of the plurality of menu items; and
   performing an action associated with the respective menu item of the plurality of menu items in response to the received selection.

3. The method of claim 2, wherein said performing an action associated with the respective menu item of the plurality of menu items in response to the received selection comprises:
   generating an additional menu that corresponds to the respective menu item of the plurality of menu items, the additional menu including a plurality of additional menu items peripherally arranged around an additional central menu item;
   mapping each of the plurality of additional menu items to the plurality of selectable numbers of at least one input device; and
   transmitting an additional display image that includes the additional menu to the at least one display device.

4. The method of claim 1, further comprising:
   mapping the central menu item to at least one of the plurality of selectable numbers of the at least one remote input device;
   receiving a selection of the plurality of selectable numbers from the at least one remote input device, the received selection indicating the central menu item; and
   performing an action associated with the central menu item in response to the received selection.

5. The method of claim 4, wherein said performing an action associated with the central menu item of the plurality of menu items in response to the received selection comprises:
   transmitting an additional display image that does not include the menu to the at least one display device.

6. The method of claim 4, wherein said performing an action associated with the central menu item of the plurality of menu items in response to the received selection comprises:
   transmitting an additional display image that includes a previous menu to the at least one display device.

7. The method of claim 1, wherein each of the plurality of menu items have a first portion with a first width and a second portion with a second width, the first width smaller than the second width, the first portion located closer in proximity to the central menu item than the second portion.

8. The method of claim 1, wherein the central menu item includes a number that identifies an element of the plurality of selectable numbers mapped to the central menu item.

9. The method of claim 8, wherein the central menu item further includes a menu item indicator that identifies an action associated with the central menu item.

10. The method of claim 1, wherein the menu further includes at least one additional menu item that is not peripherally arranged around the central menu item and at least one additional number that is not associated with a menu item of the plurality of menu items, the at least one additional number mapped to at least one additional selectable number on the at least one remote input device.

11. The method of claim 10, further comprising:
receiving a selection of the at least one additional selectable number from the input device;
generating an additional menu, the additional menu including the at least one additional menu item peripherally arranged around the central menu item and at least one menu item of the plurality of menu items not peripherally arranged around the central menu item;
changing the mapping of the plurality of selectable numbers mapped to the at least one menu item of the plurality of menu items to be mapped to the at least one additional menu item; and
transmitting an additional display image that includes the additional menu to the at least one display device.

12. The method of claim 1, further comprising:
displaying the display image on the at least one display device.

13. A system for providing a user interface, comprising:
a receiver component operable to receive a selection of at least one of a numerical value from a remote input device;
at least one processing unit, operable to generate a menu that includes a plurality of menu items peripherally arranged around a central menu item; and
a transmitter component operable to transmit a display image that includes the menu to at least one display device;
wherein the at least one processing unit is operable to perform an action associated with at least one of the central menu item or a menu item of the plurality of menu items in response to the selection of a numerical value on the remote input device received by the receiver component, the plurality of numerical values each being mapped to a respective one of the menu items;
wherein at least a portion of the peripheral arrangement of the plurality of menu items correspond to the visual layout of the selectable numbers on the at least one remote input device;
wherein at least one of the selectable numbers on the at least one remote input device is used to alter the central menu item around which the peripherally arranged menu items are arranged and to alter the mapping of the at least one of the plurality of menu items to a respective selectable number on the at least one remote input device;
wherein at least one of the selectable numerical values on the at least one remote input device is used to perform an action; and
wherein each of the plurality of menu items includes a menu item action indicator and an associated number, the number identifying a number of the plurality of selectable numbers on the remote input device that is mapped to the respective menu item of the plurality of menu items, and the menu item action indicator identifies an action associated with the respective menu item of the plurality of menu items.

14. The system of claim 13, wherein the action comprises:
generating at least one of a first additional display image that includes an additional menu corresponding to the menu item of the plurality of menu items, a second additional display image that includes a previous menu, or a third additional display image that does not include the menu; and
transmitting one of the first additional display image, the second additional display image, or the third additional display image to the at least one display device.

15. The system of claim 13, wherein each of the plurality of menu items have a first portion with a first width and a second portion with a second width, the first width smaller than the second width, the first portion located closer in proximity to the central menu item than the second portion.

16. The system of claim 13, wherein the menu further includes at least one additional menu item that is not peripherally arranged around the central menu item and in response to a selection of a numerical value on the remote input device received by the receiver component the at least one processing unit is operable to:
generate an additional menu that includes the at least one additional menu item peripherally arranged around the central menu item and at least one item of the plurality of menu items not peripherally arranged around the central menu item;
change the mapping of the element of the plurality of selectable numerical values that is mapped to the at least one menu item of the plurality of menu items to be mapped to the at least one additional menu item; and
transmit an additional display image that includes the at least one additional menu to the to at least one display device via the transmitter component.

17. The system of claim 13, wherein the receiver component, the at least one processing unit, and the transmitter component are components of a television receiver.

18. The system of claim 13, wherein the input device comprises at least one of a mouse, a trackball, a track pad, a remote control, a keypad, a keyboard, a touch screen, a virtual keypad, or a virtual keyboard.

19. The system of claim 1, wherein selecting a number includes pressing a number on a remote control device.

* * * * *